(12) United States Patent
Quach

(10) Patent No.: US 7,779,211 B2
(45) Date of Patent: Aug. 17, 2010

(54) REDUCING LATENCY IN RESPONDING TO A SNOOP REQUEST

(75) Inventor: Tuan Quach, Fullerton, CA (US)

(73) Assignee: Intel Corporation, Santa Clara, CA (US)

( * ) Notice: Subject to any disclaimer, the term of this patent is extended or adjusted under 35 U.S.C. 154(b) by 471 days.

(21) Appl. No.: 11/980,962

(22) Filed: Oct. 31, 2007

(65) Prior Publication Data

US 2009/0113140 A1    Apr. 30, 2009

(51) Int. Cl.
*G06F 12/00* (2006.01)
(52) U.S. Cl. ......................... 711/146; 711/138
(58) Field of Classification Search .................. None
See application file for complete search history.

(56) References Cited

U.S. PATENT DOCUMENTS

| | | | | |
|---|---|---|---|---|
| 6,009,488 A | 12/1999 | Kavipurapu | ................ | 710/105 |
| 7,237,070 B2 * | 6/2007 | Guthrie et al. | .............. | 711/144 |
| 2006/0236037 A1 * | 10/2006 | Guthrie et al. | .............. | 711/141 |

OTHER PUBLICATIONS

U.S. Appl. No. 11/526,431, filed Sep. 5, 2006, entitled "Adaptively Reducing Memory Latency in a System," by Krishnakanth Sistla.

* cited by examiner

*Primary Examiner*—Jack A Lane
(74) *Attorney, Agent, or Firm*—Trop, Pruner & Hu, P.C.

(57) ABSTRACT

In one embodiment, the present invention includes a method for receiving a snoop request, providing the snoop request to a coherency engine along a first path and providing the snoop request to a bypass logic along a bypass path, and generating a speculative invalid snoop response in the bypass logic and forwarding the speculative invalid snoop response to indicate that an address associated with the snoop response is not present in a cache memory. Other embodiments are described and claimed.

14 Claims, 4 Drawing Sheets

REDUCING LATENCY IN RESPONDING TO A SNOOP REQUEST

BACKGROUND

Advanced computer systems are being developed with a point-to-point (PTP) interconnect technology between processors such as central processing units (CPUs) and between CPUs and an input/output (I/O) hub (IOH) for speed, performance and scalability.

For such systems, where there is no snoop filter in any CPU node, a requesting node (e.g., a processor node) that wants to have ownership of a cache line address needs to broadcast the snoop to all nodes in the system and collect all snoop responses before the cache line ownership can be granted to the requesting node. For a broadcast snoop, the IOH node would normally be the last one to return a snoop response (since the IOH core runs at a much slower clock than a CPU core). This slower IOH snoop response has a negative impact on performance, since cache line ownership cannot be decided until all snoops are received, therefore blocking other requests targeting the same cache line and blocking the request from being evicted to make room for a new request.

DETAILED DESCRIPTION

In various embodiments, a snoop request received in a slower system component such as an I/O hub may be handled with a reduced response latency by speculatively returning an invalid response for all snoops received from a processor, while the cache line associated with the snoop request is looked up in a temporary storage such as a cache of the selected system component.

Figure 1:
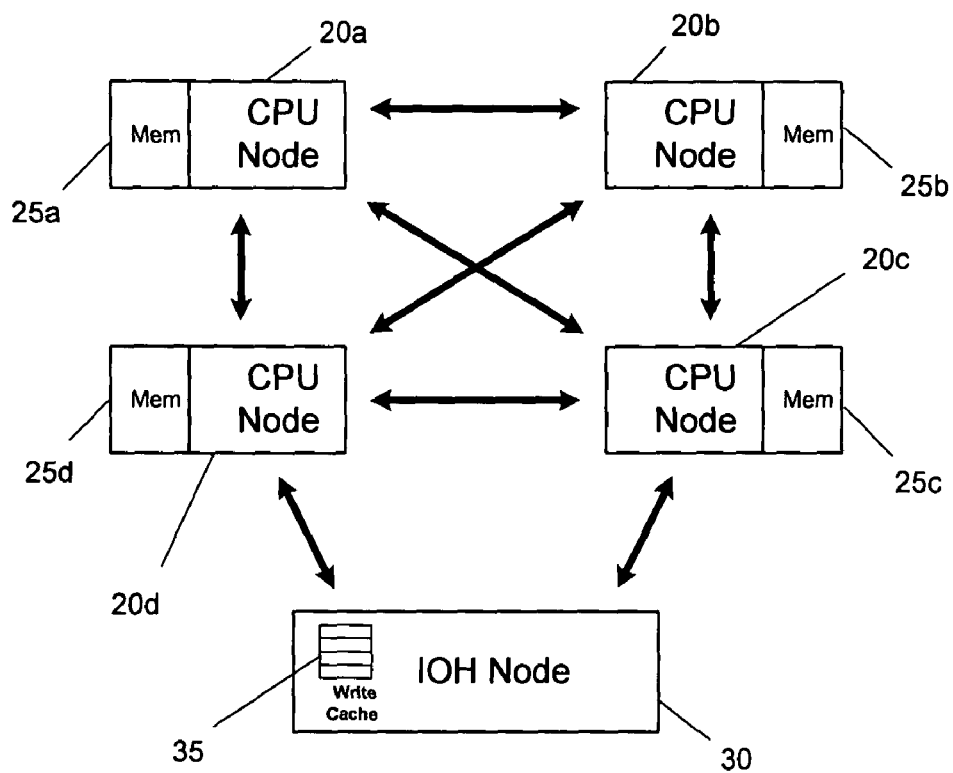
FIG. 1 is a block diagram of a system in accordance with one embodiment of the present invention.

While the scope of the present invention is not limited in this regard, various embodiments may be incorporated in a system implementing a point-to-point (PTP) interconnect system. Referring now to FIG. 1, shown is a block diagram of a system in accordance with one embodiment of the present invention. As shown in FIG. 1, system 10 includes a plurality of processor nodes, namely nodes 20a-20d (generically processor node 20), each of which is closely associated with a local portion of main memory, such as a dynamic random access memory (DRAM), namely memory 25a-25d (generically memory 25). In various embodiments, each processor node 20 may include a memory controller integrated within it to interface with the corresponding memory. As shown in FIG. 1, each node is coupled to other nodes by one of a plurality of PTP interconnects. Furthermore, note that I/O hub node 30 is coupled by PTP interconnects to processor nodes 20c and 20d. In turn, I/O hub node 30 includes a write cache 35 to temporarily store various data. Note that in some embodiments, the write cache in IOH node 30 may be very small (e.g., 128 cache lines), therefore, the cache hit rate is very small (our analysis has shown that the hit rate would be around 3%). This means that 97% of the snoop responses from IOH is an invalid snoop response (RspI), indicating that the requested data is not present in the IOH. Thus embodiments may speculatively generate such response to reduce latency.

Using embodiments of the present invention, when a snoop request is received in I/O hub node 30, a so-called bypass path may be traversed to generate a speculative invalid snoop response, which indicates that the requested cache line is not present in write cache 35. If instead it is determined that the requested cache line is in fact present in write cache 35, embodiments may prevent this invalid response from being transmitted from I/O hub node 30.

Assume a source processor Node B broadcasts a snoop request to all nodes. Node H is a Home node that owns the requested cache line data. It needs to wait for all snoop responses before it can grant cache line ownership to node B. In this case it has to wait for an IOH snoop response before it can return the data response to Node B and grant Node B the cache line ownership, which can negatively impact performance.

Typically a snoop packet received by an IOH from a processor node needs to go through a number of logic blocks like physical layer, link layer and clock crossing logic of a component before the snoop is presented to a protocol layer including queue, arbitration, dispatch, decode, service, format, router logic, so that a response can be formatted and returned to a home node. However, latency increases as the snoop and the generated snoop response go through these logic blocks. Note that a destination node where a snoop response needs to return to is not the same node that the snoop was received from; therefore the snoop needs to go through address decoding, routing, etc. to identify a destination node for the generated snoop response.

In a PTP system, agents communicate data via an interconnection hierarchy that typically includes a protocol layer, an optional routing layer, a link layer, and a physical layer. This interconnection hierarchy may be implemented in an interface of each agent. That is, each agent may include one or more interfaces to enable communication.

The protocol layer, which is the highest layer of the interconnection hierarchy, institutes the protocol. The protocol layer is a set of rules that determines how agents communicate. For example, the protocol sets the format for a transaction packet, which may correspond to the unit of data that is communicated between nodes. Such a packet typically contains information to identify the packet and its purpose (e.g., whether it is communicating data in response to a request or requesting data from another node).

The routing layer determines a path over which data is communicated between nodes. Because in some systems, each node may not be connected to every other node, there can be multiple paths over which data may be communicated between two particular nodes. The link layer receives transaction packets from the protocol layer (or routing layer if it is present) and communicates them in a sequence of flits (which may be 80 bits in one embodiment). The link layer handles flow control, which may include error checking and encoding mechanisms. Through the link layer, each node keeps track of data sent and received and sends and receives acknowledgements in regard to such data.

Finally, the physical layer may include the actual electronics and signaling mechanisms at each node. In a point-to-point, link-based interconnection scheme, there are only two agents connected to each link. The physical layer and link layer include mechanisms to deal with high-speed serial links with relatively high bit error rates, high latency and high round trip latency.

In this hierarchy, the link layer may transmit data in flits which may then be decomposed into phits (e.g., ¼ of a flit length) at the physical layer and communicated over a PTP interconnect to the physical layer of a receiving agent. The received phits may then be integrated into flits at the physical layer of the receiving agent and forwarded to the link layer of the receiving agent, which combines the flits into transaction packets for forwarding to the protocol layer of the receiving agent. Of course, other protocols may handle communications differently, and the scope of the present invention is not limited in this regard.

Thus while embodiments of the present invention may be implemented in many different system types, some embodiments may be used in systems incorporating a PTP communication protocol, for example, a serial-based PTP communication protocol. Such systems may be subject to communication latencies as a result of the serial communication protocol such as described above. For example, in contrast to a shared bus structure, such as a front side bus (FSB)-type implementation, there are various overhead delays associated with protocol processing, serialization/de-serialization and so forth. However, it is to be understood that embodiments may be implemented in many different types of systems.

Figure 2:
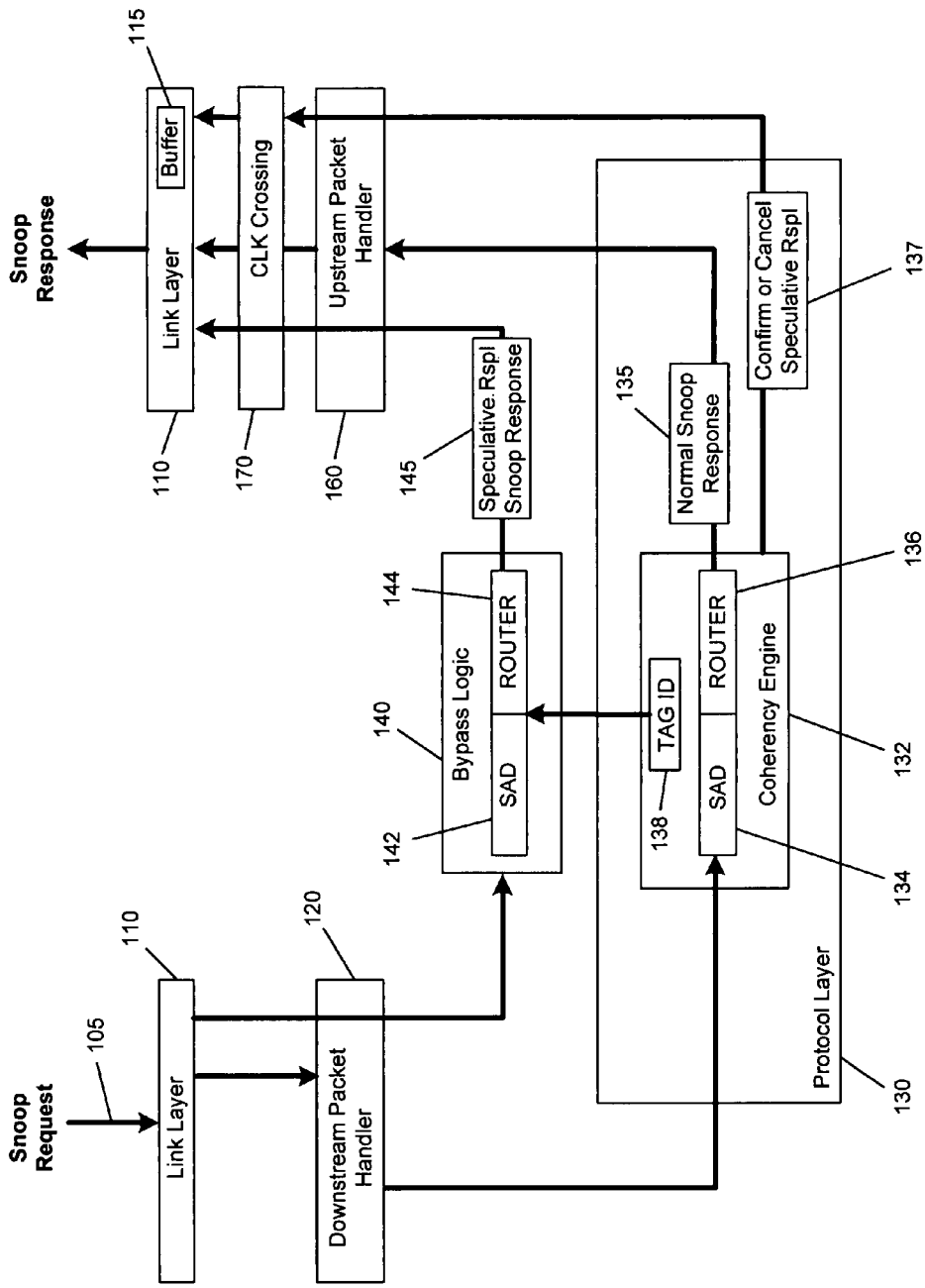
FIG. 2 is a block diagram of a portion of an I/O hub in accordance with an embodiment of the present invention.

Referring now to FIG. 2, shown is a block diagram of a portion of an I/O hub in accordance with an embodiment of the present invention. As shown in FIG. 2, I/O hub 30 may include a link layer 110 that is coupled to receive an incoming snoop request 105, which is then provided to a downstream packet handler 120, which in turn provides this request to a protocol layer 130. In addition to providing the snoop request to protocol layer 130, link layer 110 further directly provides the snoop request on a direct path to coherency bypass logic 140.

As shown in FIG. 2, coherency bypass logic 140 includes a source address decoder (SAD) 142, and a router 144. Furthermore, as shown in FIG. 2 coherency bypass logic 140 is coupled to receive a tag identifier (ID) from a tag ID generator 138 of a coherency engine 132 of protocol layer 130. Coherency engine 132 similarly includes a SAD 134 and a router 136, which is used to normally handle snoop transactions.

Still referring to FIG. 2, note that the speculative invalid snoop response 145 generated by coherency bypass logic 140 is provided directly back to link layer 110, where it may be buffered prior to sending. Before this invalid response is sent, a confirmation or cancellation message 137 may be received from coherency engine 132, wherein if message 137 is a confirmation the invalid snoop response will be sent, otherwise if message 137 is a cancellation message, the invalid snoop response is cancelled. In any event, coherency engine 132 further generates a normal snoop response 135 after the normal cache coherency processing is performed. Snoop response 135 is provided to an upstream packet handler 160 that in turn is provided through clock crossing logic 170 back to link layer 110. Thus, in various embodiments a snoop response is always generated in coherency engine 132 and is forwarded to upstream packet handler 160 if it is a cache line hit. If it is a cache line miss, the snoop response is dropped and the speculative snoop response confirmation message 137 is sent.

Embodiments may thus shorten snoop response latency by speculatively returning an invalid response (RspI) for all snoops received from a CPU while the cache line is being looked up in the write cache. The coherency bypass logic 140 may have the same SAD and router logic for destination ID decoding, but lacks the write cache address match. Bypass logic 140 is running at the same frequency as link layer 110. The TagID is assigned for all snoops using the bypass path so that a snoop response on the bypass path can either be cancelled or confirmed to send the invalid snoop response on the PTP fabric. A response queue 115 in link layer 110 may capture speculative RspI snoop responses. By matching up the TagID between a RspI response in link layer 110 and message 137 returned from protocol layer 130, a speculative snoop response is confirmed and sent to the PTP fabric if a coherent write cache address lookup resulted in a miss, otherwise the RspI snoop response in link layer 110 is cancelled if the coherent write cache address lookup resulted in a hit (e.g., exclusive or modified cache line), and the response returned from protocol layer 135 after full protocol layer processing is used for sending on the PTP fabric.

A snoop request packet is thus sent directly from link layer 110 along the bypass path to bypass logic 140 and a snoop response is returned directly to link layer 100; the coherency bypass logic 140 and link layer 110 may run at the same frequency. This bypass mechanism also eliminates the clock crossing between link layer 110 and protocol layer 130.

Figure 3:
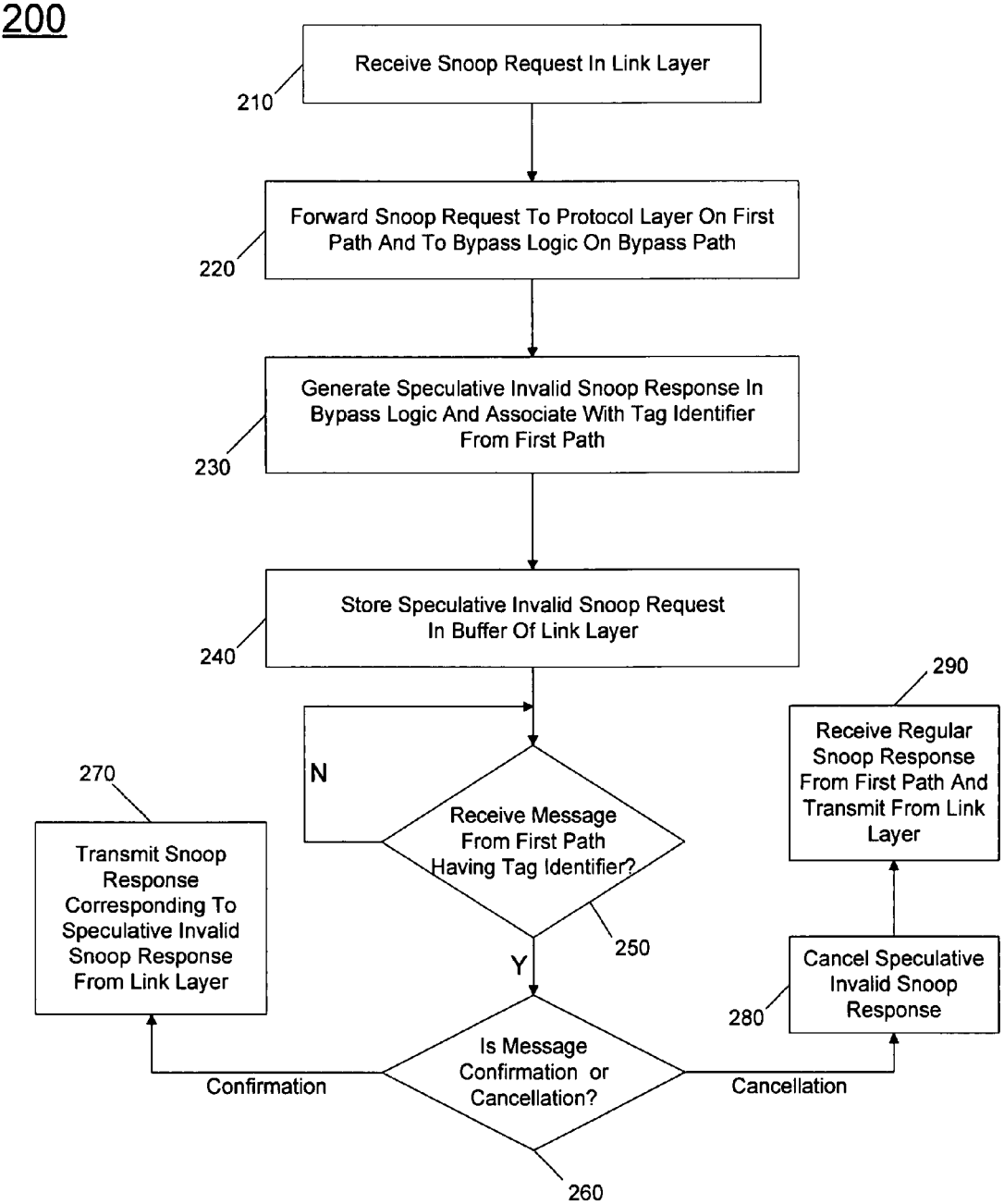
FIG. 3 is a flow diagram of a method in accordance with an embodiment of the present invention.

Referring now to FIG. 3, shown is a flow diagram of a method in accordance with an embodiment of the present invention. As shown in FIG. 3, method 200 may be performed in a system agent such as an I/O hub or other agent that has potentially slower processing times than a processor node. As shown in FIG. 3, method 200 may begin by receiving a snoop request in a link layer (block 210). Such a snoop request may be for ownership of a cache line. At block 220, the link layer may forward the snoop request to both a protocol layer for normal snoop handling on a first path, as well as to bypass logic on a bypass path. Then at block 230 in the bypass path, a speculative invalid snoop response may be generated and associated with a tag identifier. This tag identifier may be received from the protocol layer, e.g., a coherency engine thereof, which generates the tag identifier when the snoop request is received.

Referring still to FIG. 3, the generated speculative invalid snoop response may be stored in a buffer of a link layer, along with the tag identifier (block 240). For example, in some embodiments, the buffer may correspond to a content addressable memory (CAM) accessible by the tag identifier. From block 240, control passes to diamond 250, where it may be determined whether a message is received from the first path having the tag identifier. If not, diamond 250 may loop back on itself. When such a message is received it may be determined at diamond 260 whether the message is a confirmation or a cancellation message.

If the message is a confirmation message, control passes to block 270 where a snoop response may be transmitted that corresponds to the speculative invalid response. More specifically, the link layer may transmit the snoop response, which may correspond to an early snoop response, i.e., a snoop response that is transmitted multiple cycles earlier than otherwise would be possible if the full snoop handling path is followed. The link layer may also remove the associated entry from the buffer in the link layer.

If a cancellation message is received from diamond 260 control passes to block 280, where the speculative invalid snoop response may be cancelled in the buffer. Thus the entry in the buffer is invalidated and control passes to block 290, where after normal snoop response handling, the regular snoop response may be received from the first path and transmitted from the link layer. Note that this snoop response thus is sent with the normal latency for snoop processing, in contrast to the snoop response transmitted in block 270, which may be transmitted multiple cycles earlier. While shown with this particular implementation in the embodiment of FIG. 3, the scope of the present invention is not limited in this regard.

Figure 4:
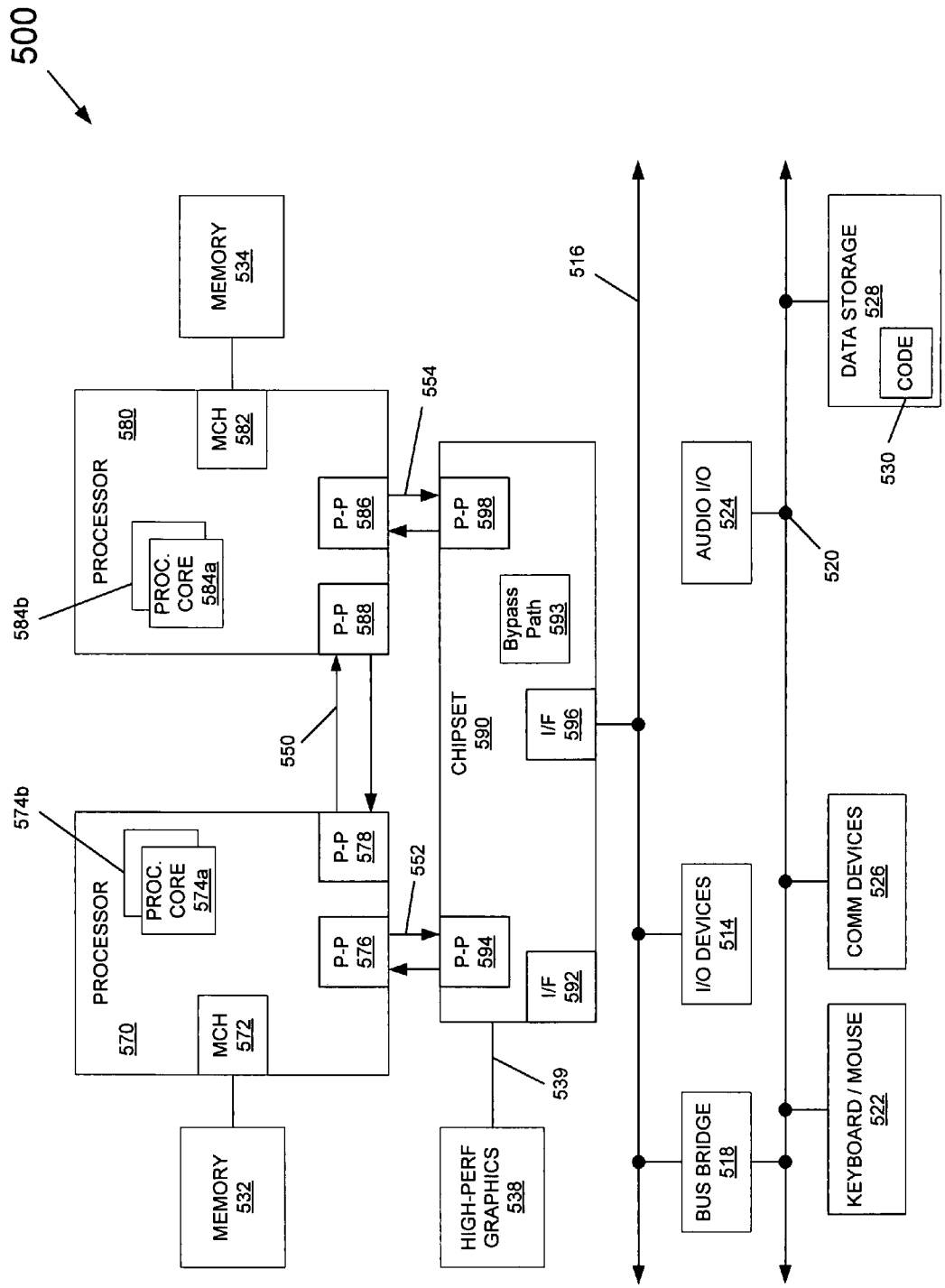
FIG. 4 is a block diagram of a system in accordance with an embodiment of the present invention.

Embodiments may be implemented in many different system types. Referring now to FIG. 4, shown is a block diagram of a system in accordance with an embodiment of the present invention. As shown in FIG. 4, multiprocessor system 500 is a point-to-point interconnect system, and includes a first processor 570 and a second processor 580 coupled via a point-to-point interconnect 550. As shown in FIG. 4, each of processors 570 and 580 may be multicore processors, including first and second processor cores (i.e., processor cores 574a and 574b and processor cores 584a and 584b).

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 4, chipset 590 includes P-P interfaces 594 and 598.

Chipset 590 may further include a bypass path 593. Bypass path 593 may be used to directly handle received snoop requests to bypass at least protocol layer processing to generate and potentially transmit an early invalid snoop response. In this way, early snoop responses corresponding to data misses may be sent out of chipset 590.

Furthermore, chipset 590 includes an interface 592 to couple chipset 590 with a high performance graphics engine 538. In turn, chipset 590 may be coupled to a first bus 516 via an interface 596. As shown in FIG. 4, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments may thus improve performance in a system where there is an IOH or other device having a write cache that runs at slower speed than a CPU. Such faster snoop responses may benefit systems performance, especially for systems with CPU that has direct memory interface where data can be quickly retrieved from local memory but cannot be utilized because not all snoop responses have been received for it to grant cache line ownership.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    receiving a snoop request in a link layer of an agent from a processor node;
    providing the snoop request to a coherency engine of a protocol layer of the agent along a first path and providing the snoop request to a bypass logic of the agent along a bypass path; and
    generating a speculative invalid snoop response in the bypass logic and forwarding the speculative invalid snoop response to a buffer in the link layer, the speculative invalid snoop response to indicate that an address associated with the snoop response is not present in a cache memory of the agent.

2. The method of claim 1, further comprising processing the snoop request in the coherency engine to determine if the address is present in the cache memory, and if so sending a first message to the link layer to cancel the corresponding speculative invalid snoop request in the buffer, otherwise sending a second message to the link layer to confirm the corresponding speculative invalid snoop response.

3. The method of claim 2, further comprising generating a snoop response in the coherency engine if the address is present in the cache memory.

4. The method of claim 2, further comprising transmitting a confirmed speculative invalid snoop response from the agent at least a plurality of cycles faster than a snoop response generated in the protocol layer, if the second message is sent.

5. The method of claim 1, further comprising generating a tag identifier in the coherency engine and associating the tag identifier with the speculative invalid snoop response and storing the speculative invalid snoop response and the tag identifier in the buffer of the link layer.

6. The method of claim 5, further comprising clocking the bypass logic at a common frequency with the link layer.

7. An apparatus comprising:
    an input interface to receive a snoop request from a processor node, the input interface to provide the snoop request to a coherency engine along a first path and provide the snoop request to bypass logic along a bypass path;
    the bypass logic coupled to the input interface by the bypass path, the bypass logic to generate a speculative invalid snoop response and forward the speculative invalid snoop response to an output interface, the speculative invalid snoop response to indicate that an address associated with the snoop response is not present in a cache memory;
    coherency logic coupled to the input interface by the first path, the coherency logic to process the snoop request in the coherency engine to determine if the address is present in the cache memory and send a message to the output interface; and
    the output interface coupled to the bypass logic and the coherency logic.

8. The apparatus of claim 7, further comprising a queue coupled to the bypass logic and the coherency logic, the queue including a plurality of entries to store speculative invalid snoop requests and corresponding tag identifiers.

9. The apparatus of claim 8, wherein the queue is to determine if a match exists between the message received from the coherency logic and an entry in the queue, wherein the output interface is to transmit a confirmed speculative invalid snoop response at least a plurality of cycles faster than a snoop response generated in the coherency logic, if the address is not present in the cache memory.

10. The apparatus of claim 7, wherein the bypass logic, the input interface and the output interface are to be clocked at a common frequency.

11. The apparatus of claim 10, wherein the apparatus comprises a system node to be clocked at a lower frequency than a processor node.

12. The apparatus of claim 7, wherein the coherency logic is to send a first message to the output interface to cancel the corresponding speculative invalid snoop request in the buffer, otherwise send a second message to the output interface to confirm the corresponding speculative invalid snoop response.

13. The apparatus of claim 12, wherein the coherency logic is to generate a snoop response in the coherency engine if the address is present in the cache memory.

14. The apparatus of claim 13, wherein the output interface is to transmit a confirmed speculative invalid snoop response from the agent at least a plurality of cycles faster than a snoop response generated in the coherency engine, if the second message is sent.

\* \* \* \* \*